(12) United States Patent
Liu et al.

(10) Patent No.: US 9,144,304 B2
(45) Date of Patent: Sep. 29, 2015

(54) BOOKCASE SYSTEM

(75) Inventors: Hsien-Wen Liu, New Taipei (TW);
Cheng-Min Yang, Kaohsiung (TW)

(73) Assignee: AUDEN TECHNO CORP., Taoyuan County (TW)

( * ) Notice: Subject to any disclaimer, the term of this patent is extended or adjusted under 35 U.S.C. 154(b) by 758 days.

(21) Appl. No.: 13/466,100

(22) Filed: May 7, 2012

(65) Prior Publication Data

US 2013/0292347 A1 Nov. 7, 2013

(51) Int. Cl.
*H01Q 1/00* (2006.01)
*A47B 63/00* (2006.01)
*G06Q 10/08* (2012.01)
*G06Q 50/10* (2012.01)
*A47F 10/00* (2006.01)

(52) U.S. Cl.
CPC ............... *A47B 63/00* (2013.01); *G06Q 10/08* (2013.01); *G06Q 50/10* (2013.01); *A47F 2010/005* (2013.01)

(58) Field of Classification Search
CPC ........ H01Q 1/44; H01Q 1/2208; H01Q 1/007
USPC .......................................... 343/720, 904, 702
See application file for complete search history.

(56) References Cited

U.S. PATENT DOCUMENTS

| 2007/0075911 | A1* | 4/2007 | Yaginuma et al. | ............ 343/853 |
| 2008/0129638 | A1* | 6/2008 | Ong | .............................. 343/873 |
| 2008/0284654 | A1* | 11/2008 | Burnside et al. | ........ 343/700 MS |
| 2010/0123553 | A1* | 5/2010 | Banerjee et al. | ............. 340/10.1 |

\* cited by examiner

*Primary Examiner* — Dameon E Levi
*Assistant Examiner* — Collin Dawkins
(74) *Attorney, Agent, or Firm* — Li&Cai Intellectual Property (USA) Office

(57) ABSTRACT

A bookcase system is provided. The bookcase system includes at least adjacently arranged two bookcase units. Each of the bookcase units further includes a first RFID reader having an antenna and placed on a first lateral side of the bookcase unit. The bookcase unit further includes a separating structure placed between two of the adjacently arranged bookcase units. The separating structure may further include at least three metal plates forming a three-layer stacked structure, and a lateral side of each of the metal plates is larger than half of a wavelength of an operating frequency of the antenna. And books are placed along a direction parallel to the lateral side.

8 Claims, 4 Drawing Sheets

BOOKCASE SYSTEM

BACKGROUND OF THE INVENTION

1. Field of the Invention

The instant disclosure relates to a bookcase system, and more particularly, to a bookcase system that is equipped with the radio frequency identification (RFID) technology for facilitating the management of books.

2. Description of Related Art

The RFID technology utilizes RFID readers which are electro-magnetic readers with antennas to generate electro-magnetic fields or emit electro-magnetic waves to RFID tags. The RFID tags upon the receipt of the electro-magnetic fields/waves could generate responding electro-magnetic fields/waves for the RFID readers for the identification purpose. The RFID-based identification has been widely used in automation, warehouse management, and electronic token.

Bookcase systems having bookcase units have been the primary equipment for the placement of the books or other reference materials. And the increasing volume of the books or reference materials increase poses a challenge to the management of the books/reference materials. Traditionally, the books are associated with the RFID tags for being identified by the RFID readers.

However, the traditional approach of the book identification may not be able to identify all the books in the bookcase system. For example, when twenty or even thirty books placed continuously in the bookcase system the density of the paper and the moisture variation may preclude the electro-magnetic fields/waves from penetrating the books, negatively affecting the identification of the books. Also, the responding/reflective electro-magnetic fields/waves may be received by the RFID readers not for the bookcase units where the books are placed.

SUMMARY OF THE INSTANT DISCLOSURE

The primary objective of the instant disclosure is to provide a bookcase system with the improved identification of books placed within the bookcase system. The bookcase system includes at least adjacently arranged two bookcase units. Each of the bookcase units further includes a first RFID reader having an antenna and placed on a first lateral side of the bookcase unit. The bookcase unit further includes a separating structure placed between two of the adjacently arranged bookcase units. The separating structure may further include at least three metal plates forming a three-layer stacked structure, and a lateral side of each of the metal plates is larger than half of a wavelength of an operating frequency of the antenna. And the books are placed along a direction parallel to the lateral side.

The disclosed bookcase system is capable of having the books identified by the RFID readers in the bookcase units where the books identified are placed. In short, only the RFID reader in the bookcase unit could be used to identify the books in that particular bookcase unit, so that the identification of the books may be improved or enhanced.

In order to further the understanding regarding the instant disclosure, the following embodiments are provided along with illustrations to facilitate the disclosure of the instant disclosure.

DETAILED DESCRIPTION OF THE EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

[One Embodiment of a Bookcase System]

Figure 1:
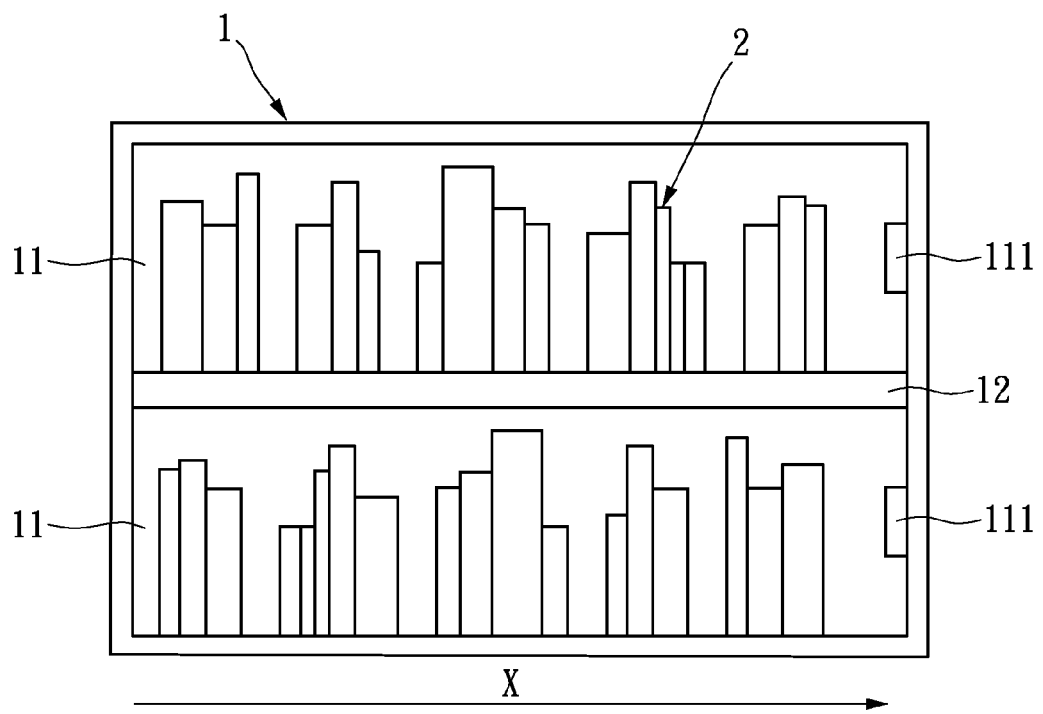
FIG. 1 is a schematic diagram of a bookcase system according to one embodiment of the instant disclosure.

Please refer to FIG. 1 of a schematic diagram of a bookcase system according to one embodiment of the instant disclosure. The bookcase system 1 may include at least two bookcase units 11 and at least one separating structure 12. Each of the bookcase units 11 may be associated with one first RFID reader 111. For the illustration purpose, the bookcase system 1 shown in FIG. 1 includes two adjacently arranged bookcase units 11 and one separating structure 12, though it is appreciated that the protective scope of the instant disclosure is not limited as the result. As such, the bookcase system of the instant disclosure may include a plurality of the bookcase units 11 and the plurality of the separating structures 12.

The bookcase units 11 may be stacked together as shown in FIG. 1, and each of the bookcase units 11 may be used for the placement of books 2, each of which may be associated with a RFID tag (not shown). Each of the associated first RFID readers 111 may be placed on a first lateral side of the bookcase unit 11. In one implementation, the first lateral side may refer to a right inner wall of the bookcase unit 11. The separating structure 12 may be located between the two adjacently arranged bookcase units 11.

Each of the bookcase units 11 may be associated with a metal frame, and the stacked bookcase units 11 may be formed monolithically as one bookcase main body. When the bookcase unit 11 is associated with the metal frame or the bookcase main body is made of a metal, electro-magnetic waves arising out of the operation of the first RFID reader 111 and the RFID tag of the books 2 may not be reflected outside the bookcase units 11 or the bookcase main body, reducing the possibility of misidentification of the RFID tag of the books 2. Similarly, since the bookcase units 11 may be associated with the metal frames, or the bookcase main body may be made of the metal, electro-magnetic fields or waves outside the bookcase units 11 or the bookcase main body may not penetrate to affect the operation of the first RFID reader 111.

Figure 2:
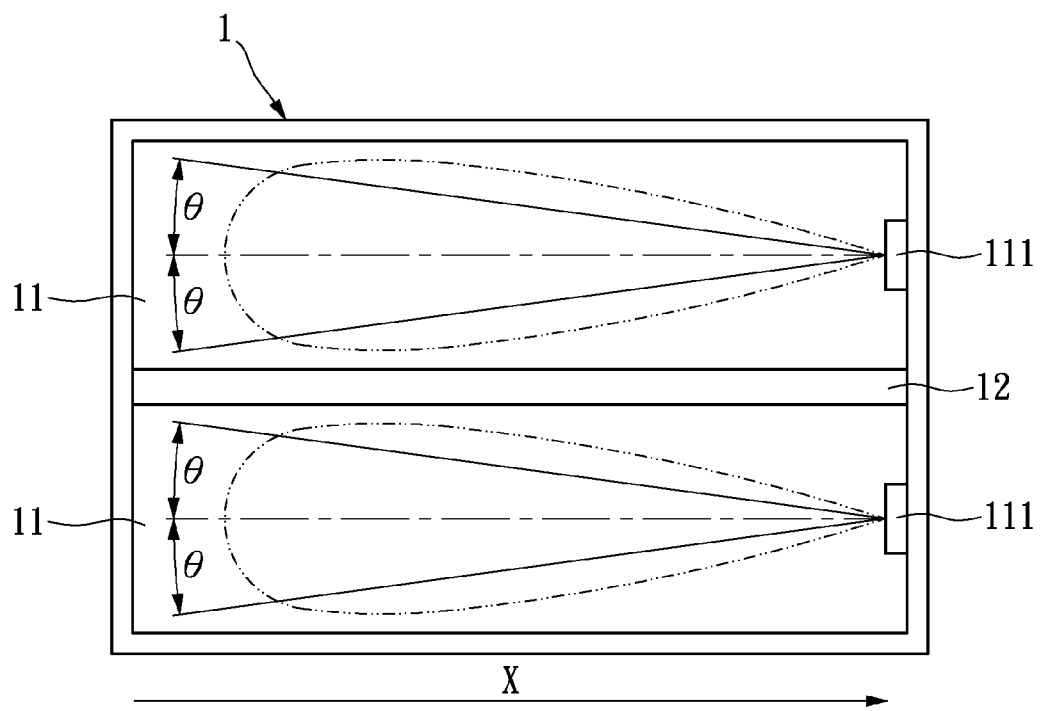
FIG. 2 is a schematic diagram illustrating a major lobe of an antenna of the first RFID reader according to one embodiment of the instant disclosure.

In conjunction with FIG. 1, FIG. 2 is a schematic diagram illustrating a major lobe of an antenna of the first RFID reader 111 according to one embodiment of the instant disclosure. The first RFID reader 111 may be adapted to read information in the RFID tag of the books 2 placed within the bookcase unit 11. The first RFID reader 111 may further include a RF circuit and a controller circuit implemented in terms of a micro controller unit (MCU) in one implementation. It is worth noting that the implementation of the RF circuit and the controller circuit may be falling into the category of being well known in the art. The antenna of the first RFID reader 111 may be an antenna array. The direction indicating the largest intensity of the major lobe of the antenna and the direction indicating half of the largest intensity of the major lobe may be separated by an angle of θ. A half power Beamwidth of the major lobe may be two times the angle of θ (i.e., 2θ) may range from 40 degrees to 50 degrees, while a maximum gain of the first RFID reader 111 may be more than 9 dBi (i.e., at least 9 dBi).

Figure 3:
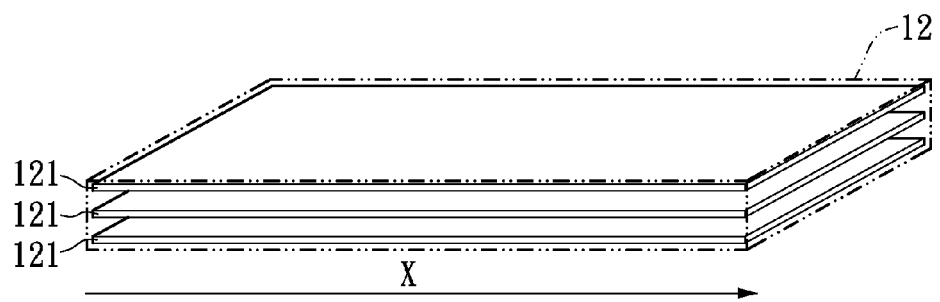
FIG. 3 is a schematic diagram of an separating structure according to one embodiment of the instant disclosure.

Please refer to FIG. 3 of a schematic diagram of a separating structure 12 according to one embodiment of the instant disclosure. Since one separating structure 12 may be placed between two adjacent bookcase units 11, the number of the separating structure 12 may be one less than the number of the bookcase units 11. The separating structure 12 may include three metal plates 121. In one implementation, the three metal plates 121 may be stacked into a three-layer structure shown in FIG. 3. As the result of the parallel wave guiding effect, the electro-magnetic waves accidentally spread into the three layered separating structure 12 may be prevented from radiating out of the separating structure further, though the electro-magnetic waves within the separating structure 12 may be transmitted in a mode of traverse electro-magnetic (TM) or traverse electric (TE). In other words, the separating structure may therefore prevent the electro-magnetic waves from spreading from one bookcase unit 11 to another bookcase unit 11. The distance between the metal plates 121 may be predetermined and the thickness of the separating structure 12 may be predetermined as well.

The length of a lateral side of the metal plates 121, which may extend along the "x" axis, may be longer than half the wavelength associated with the operating frequency of the antenna of the first RFID reader 11. For example, when the operating frequency of the antenna is 900 MHz, the length of the lateral side extending along the "x" axis of the metal plate 121 may be larger than 167 mini-meters. And the books 2 may be arranged along the "x" axis when placed within the bookcase unit 11.

Figure 4A:
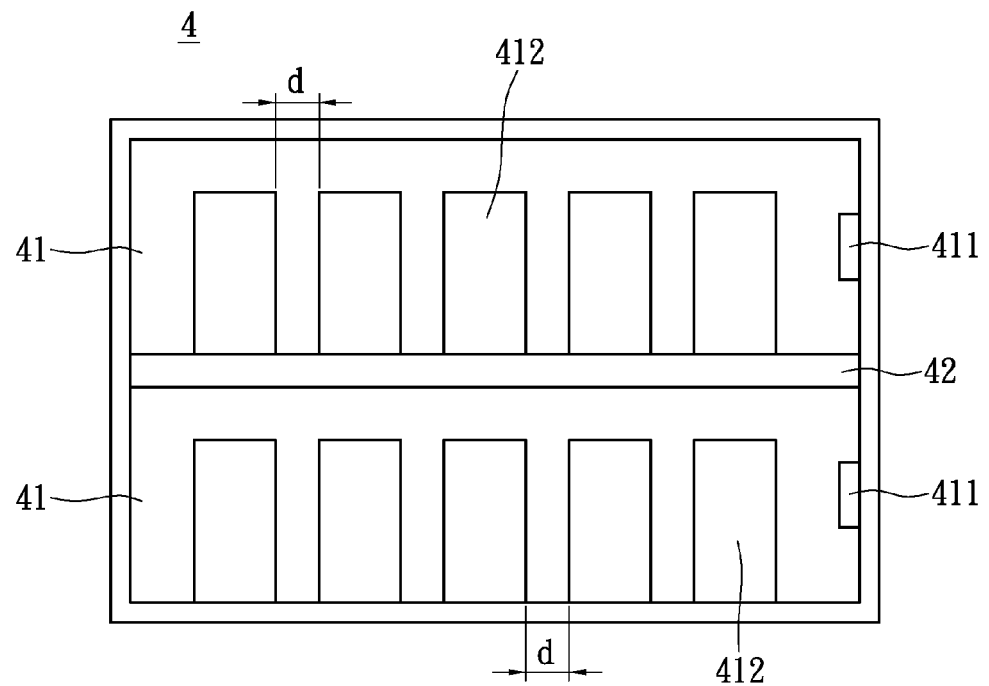
FIG. 4A is a schematic diagram of a bookcase unit having a plurality of accommodating portions according to one embodiment of the instant disclosure.

In conjunction with FIG. 1, FIG. 4A is a schematic diagram of a bookcase unit 41 having a plurality of accommodating portions 412 according to one embodiment of the instant disclosure. The accommodating portions 412 of the bookcase unit 41 of a bookcase system 4 may not be found in the bookcase unit 11 of the bookcase system 1. The accommodating portions 412 may be used for the placement of the books and may be arranged along the same "x" direction (or the lateral side of the metal plate).

The accommodating portions 412 may be implemented in terms of frames, and may define the space within which the books could be placed. The location of the accommodating portions 412 may help improve the identification of the RFID tags of the books. The accommodating portions 412 may be made of non-conductive material, enabling the penetration of electro-magnetic fields/waves associated with the operation of the first RFID reader 411 and the RFID tags of the books.

A predetermined distance "d" may separate two adjacent accommodating portions 412 and the space defined within the distance "d" has no placement of the books. With such predetermined distance "d", the insufficiency of the penetration when the books are placed within the bookcase units without proper separation in the traditional bookcase system, which may negatively affect the identification of the books, may be mitigated. When the operating frequency of the antenna of the first RFID reader 411 is 900 MHz, the predetermined distance "d" that separates the two adjacent accommodating portions 412 may be from 2 centimeters to 5 centimeters. It is worth noting that the number of the accommodating portions 412 may depend on the actual size of the bookcase main body.

Figure 4B:
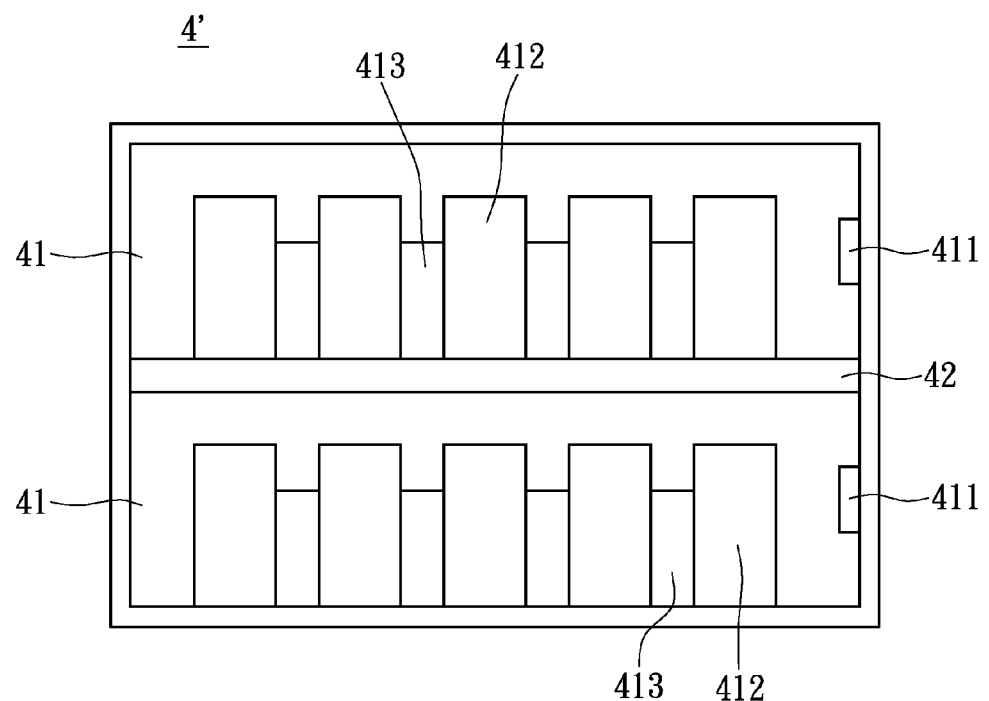
FIG. 4B is a schematic diagram of a bookcase unit having a plurality of accommodating portions and a plurality of separating portions, with each of the separating portions placed between two adjacent accommodating portions, according to one embodiment of the instant disclosure.

Please refer to FIGS. 4A and 4B at the same time. FIG. 4B is a schematic diagram of a bookcase unit 41 having a plurality of accommodating portions 412 and a plurality of separating portions 413, with each of the separating portions 413 placed between two adjacent accommodating portions 412, according to one embodiment of the instant disclosure. The bookcase unit 41 in FIG. 4B is a part of a bookcase system 4'. And that the separating portion 413 is between two adjacent accommodating portions 412 may serve as one of the difference lies between the bookcase system 4' and the bookcase system 4. The separating structure 42 may be located between the two adjacently arranged bookcase units 41.

The separating portions 413 may be made of a material allowing for the electro-magnetic fields/waves to be penetrated. As such, the separating portions 413 may be plastic, Polylon, and/or wood. Alternatively, the separating portions 413 may be a hollowed shell as the gas within the shell allows for the transmission of the electro-magnetic fields/waves. The shape of the separating portions 413 may be varying so long as the separating portion 413 may be placed within or fit into the space defined within the distance "d" separating two adjacent accommodating portions 412.

[Another Embodiment of a Bookcase System]

Figure 5:
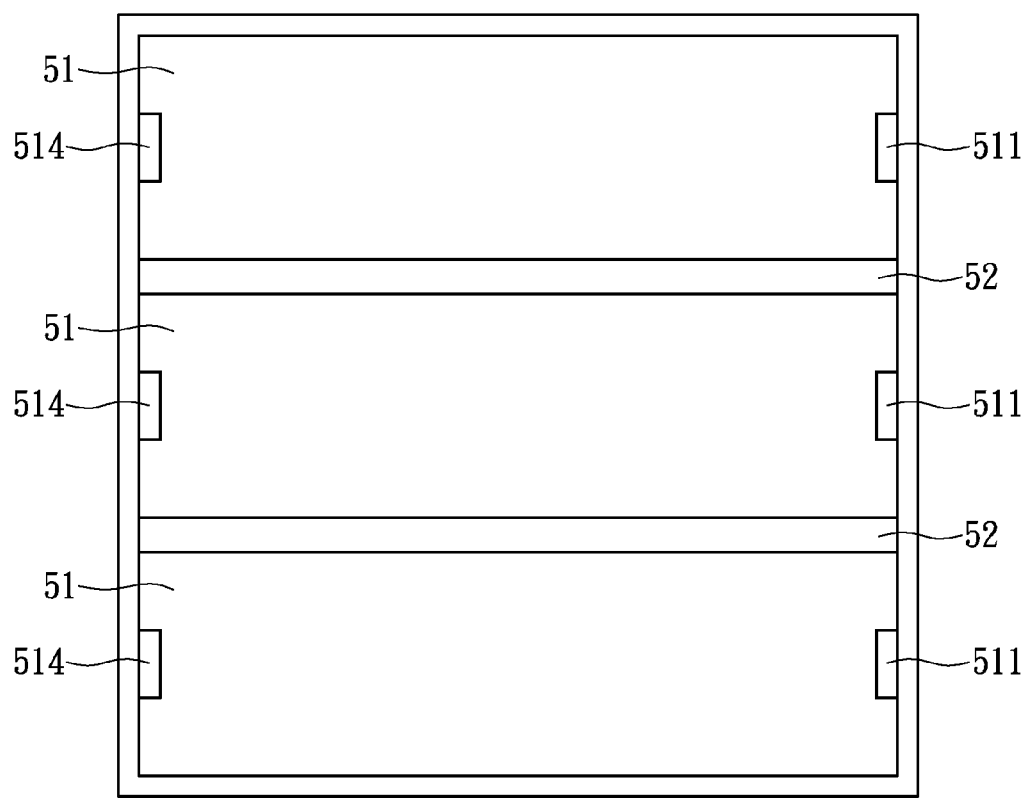
FIG. 5 is a schematic diagram of a bookcase system 5 according to one embodiment of the instant disclosure.

Please refer to FIG. 5 of a schematic diagram of a bookcase system 5 according to one embodiment of the instant disclosure. The bookcase system 5 may include three bookcase units 51 and two separating structures 52. It is worth noting that throughout the instant disclosure the separating structure and the separating portion may be interchangeable. Each of the bookcase units 51 may include a first RFID reader 511 and a second RFID reader 514, when the presence of the second RFID reader 514 may be one of the difference lies between the bookcase system 5 and the bookcase system 1. The second RFID reader 514 may be placed on a second lateral side of the bookcase unit 51 or on the left inner wall of the same. The first RFID reader 511 may be on the opposite side (e.g., the right inner wall) of the bookcase unit 51, in relation to the second RFID reader 514, which may be on the left inner wall of the bookcase unit 51. Therefore, the first RFID reader 511 and the second RFID reader 514 may face each other.

The books in the bookcase unit may be identified via the RFID tags thereof by the RFID reader(s) of the bookcase units. The bookcase system of the instant disclosure may be therefore capable of effectively identifying the books. The separating structure may be used to separate the electro-magnetic fields arising out of the RFID readers in the respective bookcase units from each other, so that only the RFID reader(s) in the bookcase unit could be used to identify the books in that particular bookcase unit. Meanwhile, since the books could be placed within the accommodating portions that are separated from each other by the predetermined distance, the identification of the books may improve.

The descriptions illustrated supra set forth simply the embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A bookcase system, comprising: at least two adjacently arranged two bookcase units, each of the bookcase units allowing for multiple books to be placed, and each of the books is equipped with a radio frequency identification (RFID) tag, wherein the bookcase units further comprise a first RFID reader having an antenna and placed on a first lateral side of the bookcase unit, for reading the RFID tag; and an separating structure placed between the two adjacently arranged bookcase units, the separating structure comprising at least three metal plates forming a three-layer stacked structure, and a lateral side of each of the metal plates larger than half of a wavelength of an operating frequency of the antenna; wherein the books are placed along a direction parallel to the lateral side; wherein the bookcase unit is equipped with a plurality of accommodating portions allowing for the books to be placed, each pair of adjacent accommodating portions are separated by a predetermined distance, and the accommodating portions are arranged along the direction parallel to the lateral side, and a plurality of separating portions placed between the two adjacent accommodating portions.

2. The bookcase system according to claim 1, wherein the adjacently arranged bookcase units are monolithically formed.

3. The bookcase system according to claim 1, wherein a half power beam-width of a major lobe of the antenna of the first RFID reader ranges from 40 degrees to 50 degrees.

4. The bookcase system according to claim 1, wherein a maximum gain of the antenna of the first RFID reader is at least 9 dBi.

5. The bookcase system according to claim 1, wherein the operating frequency of the antenna of the first RFID reader is 900 MHz, and the predetermined distance is between 2 centimeters to 5 centimeters.

6. The bookcase system according to claim 1, wherein the antenna of the first RFID reader is an antenna array.

7. The bookcase system according to claim 1, wherein each of the bookcase units further comprises a second RFID reader placed on a second lateral side opposing to the first lateral side, for reading the RFID tag of the books placed in the bookcase unit.

8. The bookcase system according to claim 1, wherein the bookcase unit is associated with a metal frame.

* * * * *